United States Patent
Gentner et al.

(10) Patent No.: US 8,086,059 B2
(45) Date of Patent: Dec. 27, 2011

(54) SUB-RASTER REGISTRATION USING NON-REDUNDANT OVERWRITING

(75) Inventors: Jess R. Gentner, Rochester, NY (US); Robert P. Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1061 days.

(21) Appl. No.: 11/948,281

(22) Filed: Nov. 30, 2007

(65) Prior Publication Data
US 2009/0142004 A1 Jun. 4, 2009

(51) Int. Cl.
*G06K 9/40* (2006.01)
*H04N 1/409* (2006.01)

(52) U.S. Cl. ..... 382/254; 358/3.24; 358/3.26; 358/3.27; 358/518

(58) Field of Classification Search .......... 382/254–275, 382/3.24, 3.26, 3.27, 518–522
See application file for complete search history.

(56) References Cited

U.S. PATENT DOCUMENTS

| | | | |
|---|---|---|---|
| 6,118,463 A | 9/2000 | Houki et al. | |
| 6,359,640 B1 | 3/2002 | Ravitz et al. | |
| 6,816,269 B1 | 11/2004 | Loce et al. | |
| 7,123,282 B2 | 10/2006 | Fields et al. | |
| 7,933,470 B2 * | 4/2011 | Handley et al. | 382/274 |
| 2003/0175602 A1 | 9/2003 | Kazama | |
| 2005/0286796 A1 * | 12/2005 | Handley et al. | 382/274 |
| 2006/0092264 A1 | 5/2006 | Matsuzaki et al. | |

OTHER PUBLICATIONS

U.S. Appl. No. 11/796,397, filed Apr. 27, 2007, Ang, et al.

* cited by examiner

*Primary Examiner* — Brian Le
(74) *Attorney, Agent, or Firm* — Fay Sharpe LLP

(57) ABSTRACT

Sub-raster registration errors are compensated for through non-redundant overwriting. Data from adjacent rasters is written to a particular output raster so that the adjacent rasters share an influence at a point actually written to by a rendering device, thereby compensating for a sub-raster component of a registration error associated with writing to the particular point. If two writing passes per raster are used and the writing passes have equal influence (e.g., are written with equal power), then writing data from a first raster during a first pass and writing data from a second raster adjacent to the first raster during a second pass compensates for a sub-raster registration error of half a raster spacing. If two writing passes are associated with different influence (e.g., are written with ⅓ and ⅔ power respectively) and/or if additional writing passes are used, then addition sub-raster positions can be compensated for or emulated.

15 Claims, 8 Drawing Sheets

SUB-RASTER REGISTRATION USING NON-REDUNDANT OVERWRITING

BACKGROUND

The systems and methods disclosed herein are related to the art of image rendering devices such as printers and displays. Embodiments will be described in terms of laser-based electro-photographic marking engines such as are used in printers, photocopiers and facsimile machines. However, embodiments are applicable to other rendering devices, such as rendering devices that present image data in raster lines, such as display devices and other kinds of printers.

In electro-photographic marking engines, an imaging member, such as, for example, a belt or a drum, is made to carry an electrostatic charge. Portions of the imaging member are then exposed to light. The light discharges the selected portions. For example, the selected portions of the imaging member are exposed to light from a scanning laser beam or to light from one or more light-emitting diodes. For instance, light pulses from a laser are reflected off a set of mirrors that are arranged in a polygonal ring and driven to spin, thereby causing the reflected beam to scan across a portion of the imaging member. Often, the design of the marking engine is such that the reflected laser beam strikes the imaging member at an angle (as opposed to orthogonally). This geometry can mean that the reflected beam sweeps out an arc across the surface of the imaging member instead of the ideal straight line. Such an arc is a source of registration error. This kind of registration error is often referred to as bow.

For example, referring to FIG. 1, image data 106 associated with, and intended for, a target output line or raster 110 of an output image 114 can be misregistered and placed or written to locations in the output image 114 other than the intended locations 118 along the target output line or raster 110.

Another kind of registration error, often referred to as skew, can be caused by imperfections in the mounting and/or alignment of the light source or laser, scanning device or mirror relative to the imaging member. An imaging device or marking engine that includes imperfections related to skew will tend to generate images that appear to be crooked or at an unintended angle relative to the display screen or print media.

Accordingly, whatever the source of registration errors, in at least some instances, without compensation, a pixel from or associated with a target or nth raster (e.g., 110) can be written to a physical location (e.g., 122, 126, 130) on the display, imaging member and/or print medium that one would ideally expect to find data from or associated with, for example, raster number n−1 (134) or n−2 (138) and so on.

Accordingly, systems designers attempt to develop rendering devices that include as few sources of registration error as practicable. Additionally, designers try to minimize the amplitude of registration errors generated by those sources that cannot be eliminated. However, sources of noticeable registration error remain in many imaging systems. As improvements are made in other system parameters, such as, for example, resolution, remaining registration errors become more noticeable. Accordingly, attempts have been made to compensate for registration error sources through image path data manipulation. For example, contone image data is manipulated to pre-warp and/or pre-skew image data in a direction opposite and in an amplitude equal to known registration errors of a particular system. However, such contone image manipulation techniques require increased processing power or processing time and either increase the cost of systems or reduce system throughput.

Other compensation techniques work with binary or marking decision data. For example, instead of driving a laser with data from or associated with the ideal or target raster, these techniques attempt to compensate for, for example, bow or skew registration error by driving the light source (e.g., laser) with data from, for example, raster number n−1 when the laser beam is predicted to be at a point in the arc that is associated with the physical location on the imaging member that one would ideally expect to find data from raster n−1 and driving the laser with data from raster n−2 when the laser is at a point in the arc that is associated with the physical location on the imaging member that one would ideally expect to find data from raster n−2. However, these systems do not adequately address registration errors associated with sub-raster (e.g., 142, 146, 148, 152, 156, 160, 164) positioning errors or displacements, wherein positions between ideal raster positions are exposed to the light source or other imaging element. Images rendered through these sorts of compensation methods can include visually displeasing distortions.

BRIEF DESCRIPTION

A method for providing rendering device registration error compensation for binary image data can include determining a set of sub-raster spacing emulation positions that can be emulated given a number of respective writing passes used by the rendering device to render images and respective target writing powers associated with each respective writing pass and for each respective writing pass associated with a currently selected target output block, preparing to render the currently selected target output block by selecting data from the binary image data based on a target output position associated with the currently selected target output block, the compensating block offset value for the target output block, the set of emulatable sub-raster positions, a writing pass number associated with a current writing pass and a target writing power associated with the current writing pass, wherein image data from respective adjacent rasters of the binary image data is selected based on the compensating block offset, wherein a sub-raster spacing correction determined from the compensating block offset value and the set of emulatable sub-raster positions is emulated by selecting data from respective adjacent rasters according to the target writing power and/or writing pass number associated with the current writing pass. The selected data can be stored for subsequent use in driving an associated rendering device, such as raster output scanner. Alternatively the selected data can be used to driving the associated rendering device directly.

For example the image data can be structured as a set of raster lines of pixels and sets of one or more raster lines can be read as respective sets of blocks of one or more pixels. A compensation profile for the associated rendering device, compensating for a registration error profile of the rendering device can be determined or selected. The number of respective writing passes to be used by the rendering device in rendering each raster line and respective writing powers associated with the respective writing passes can be based on system design or may be optionally selected.

A system for providing rendering device registration error compensation for binary image data can include a raster memory, a profile of the associated rendering device, a target output block position determiner, a compensating block offset determiner, and an output data selector.

For example, the raster memory is used to store binary input image data that is readable as at least one block, each block including at least one pixel of at least one raster line of the binary image data. The profile can include information regarding at least one of a compensation for a registration error of an associated rendering device and the registration error of the associated rendering device from which a compensation can be determined. The target output block position determiner determines a target position associated with a currently selected target output block of output image data. The compensating block offset determiner determines a compensating block offset value from a target position associated with the currently selected target output block and the profile, wherein the compensating block offset includes a whole raster part and a sub-raster part. The output data selector can select data from the raster memory for use in preparing to render the currently selected target output block based on the target output position associated with the currently selected target output block, the compensating block offset value, a number of emulatable sub-raster positions determined from a selected number of respective writing passes to be used by the associated rendering device to render the at least one raster line of the currently selected output block and a set of respective target writing powers to be used by the associated rendering device to render the at least one raster of the currently selected output block in the respective writing passes, a writing pass number associated with a current writing pass and/or a target writing power associated with the current writing pass, wherein image data from respective adjacent rasters is selected based on the compensating block offset, wherein sub-raster spacing correction is emulated by selecting data from respective adjacent rasters according to the target writing power and/or writing pass number associated with the current writing pass.

DETAILED DESCRIPTION

For a number of reasons, including increased throughput, marking engines have been developed that provide a plurality of beams for altering the charge on an imaging member. For example, marking engines that provide 32 beams that sweep across the imaging member in a swath are available. However, writing image data in swaths can lead to stitching artifacts. That is, where the portion of an image written in a first swath abuts a portion of an image written in a second swath, slight registration errors or differences between the two swaths can become noticeable and may be visually displeasing.

Accordingly, a method of writing data in two passes with partially overlapping swaths has been developed.

Figure 2:
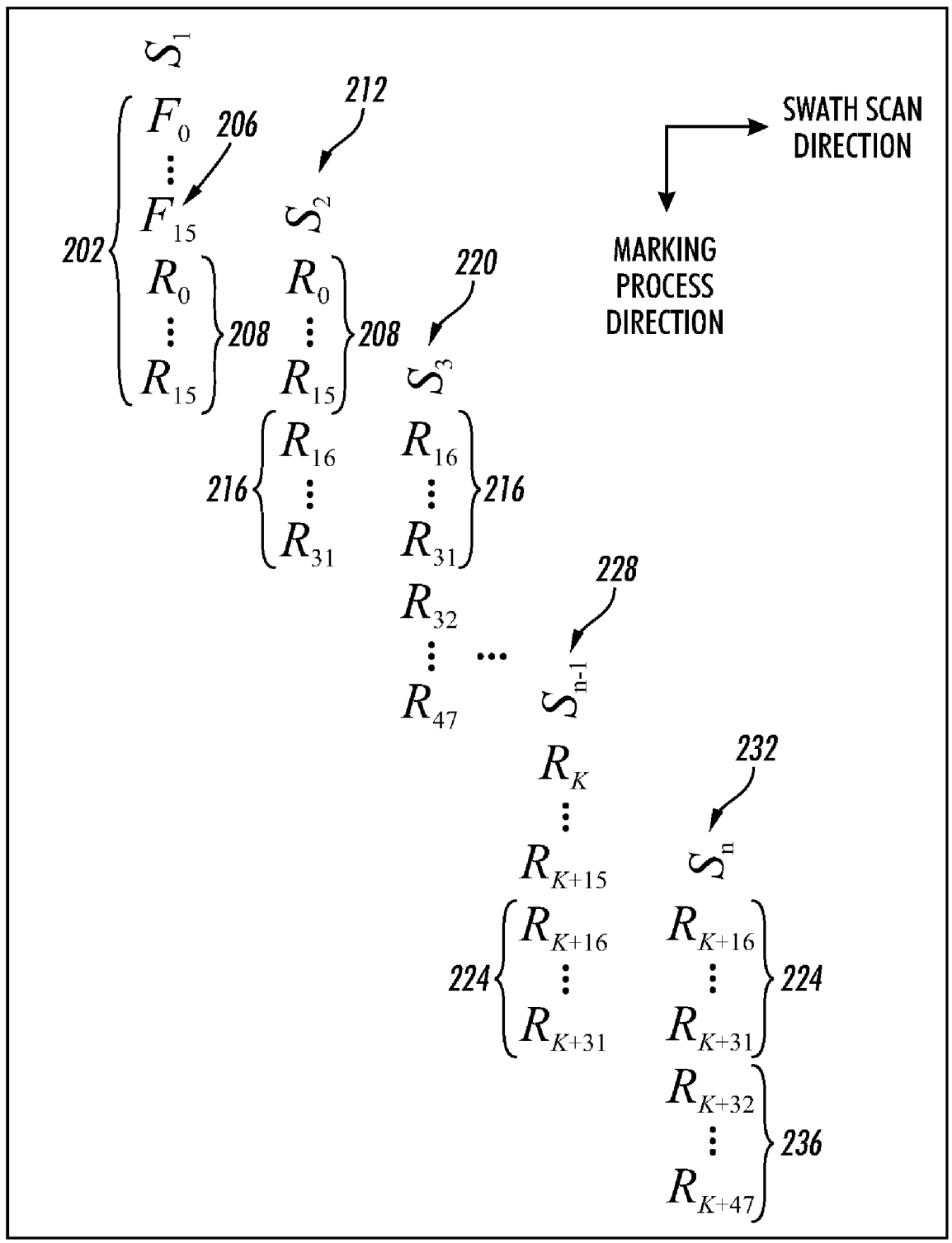
FIG. 2 illustrates a writing pattern including a plurality of swaths and redundant overwriting.
Figure 3:
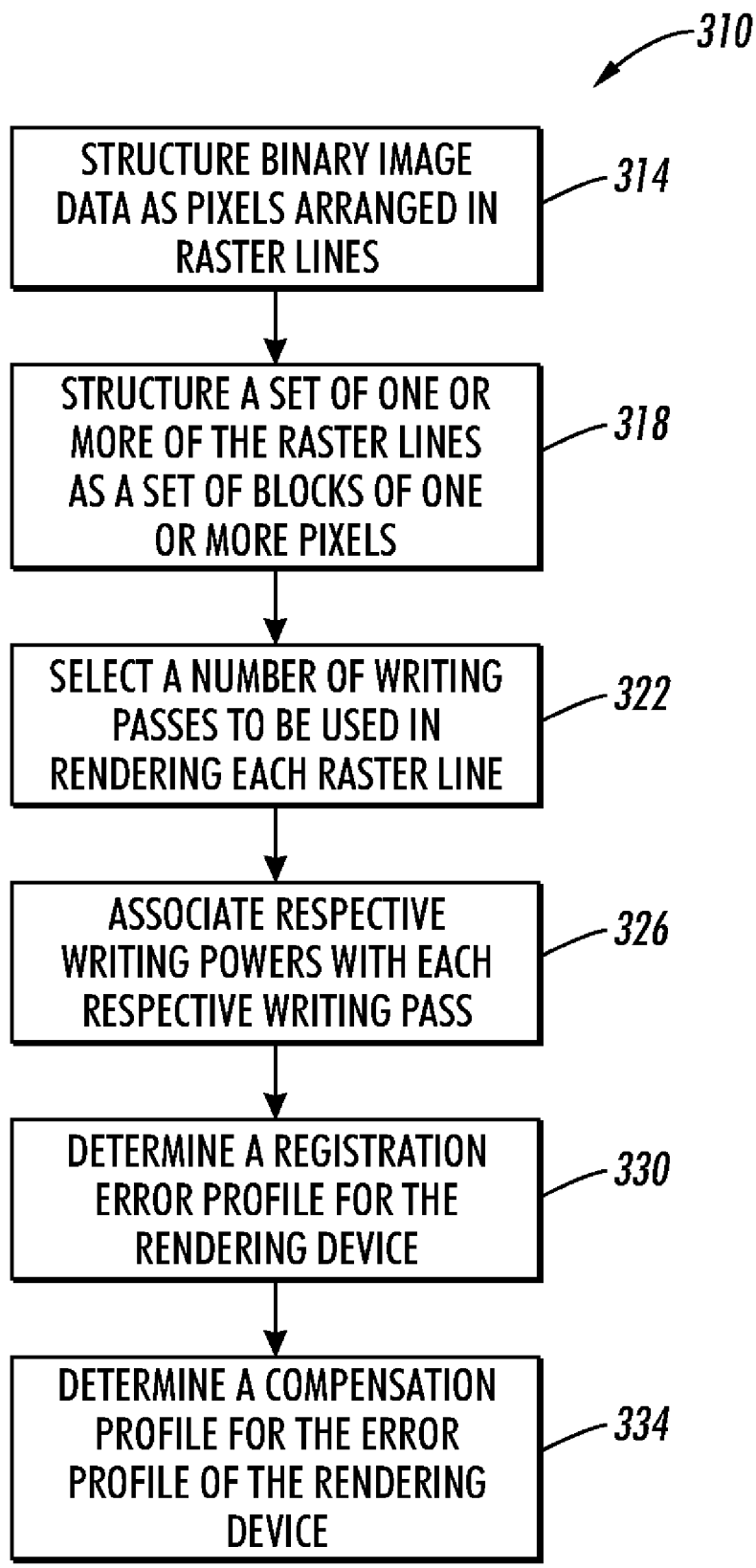
FIG. 3 is a flow chart outlining an initialization associated with a method for compensating for registration errors.

For example, referring to FIG. 2, a first swath 202 includes 16 filler rasters, which may be, for example, blank, and 16 real image data rasters 208. In a second swath 212, the same data 208 is written again in a physically overlapping manner. For instance, each writing pass transfers half the desired charge at those portions of the imaging number for which charge transfer is desired. Since each image raster is written by a first (odd) and a second (even) pass, any registration error between first and second passes is included in each raster and no step discontinuities are included in the rendered image.

The process is repeated for the entire image. For example, a second group 216 of 16 rasters is written first as part of the second swath 212 and, redundantly with the same data, again in the third swath 220. At the end of the image, a final group 224 of 16 rasters is written first in the second to last swath 228 and again in the last swath 232. A last set of 16 rasters 236 may be image data as shown or filler or padding data that is, for example, blank.

As indicated above, if a rendering device rendering the image as described above includes sources of registration error, the image rendered as described above may include registration defects and be visually displeasing. For example, the image may be distorted by bowing or may be skewed. The—redundant overwriting—of the same data in a plurality of swaths provides no means for compensating for registration imperfections in the marking engine or rendering device.

A method for providing rendering device registration error compensation for binary image data that addresses this issue can include an initialization or design phase 310 that includes structuring 314 binary image data as pixels arranged in raster lines, structuring 318 a set of one or more of the raster lines as a set of blocks of one or more pixels, selecting 322 a number of writing passes to be used in rendering each raster line, associating 326 respective writing powers with each respective writing pass, determining 330 a registration error profile for the rendering device and determining 334 a compensation profile for the error profile of the rendering device.

Structuring 318 a set of one or more of the raster lines as a set of blocks of one or more pixels can be done with an eye toward dividing raster lines into a sufficiently large number of line segments to allow registration error compensation to be performed at a sufficiently high resolution. That is, the registration error profile may be determined 322 on the basis of the blocks. For example, a compensation value may be determined 326 for each block whereby the pixels of a block may be processed as a group. For instance, it is contemplated that dividing raster lines into blocks including 128 pixels or marking decisions will provide sufficiently high registration error correction resolution. Additionally, blocks of 128 bits or pixels are conveniently stored, addressed and accessed in at least some memory designs. Embodiments that divide rasters into blocks that are sized for compatibility with available memories may have advantages in code simplicity and processing speed.

Selecting 322 the number of writing passes to be used in rendering each raster line can be performed at marking engine design time. Alternatively, a system operator or user may be provided with the ability to configure or select 322 a number of writing passes to be used at system installation and/or on a job-by-job basis. For instance, tradeoffs can be made between processing speed and the quality of swath stitching and/or the resolution with which registration errors can be corrected. That is, an operator may select an increased number of passes in order to improve swath stitching or in order to provide an increased resolution for sub-raster registration error correction according to the methods disclosed herein. Alternatively, a reduced number of passes may be selected in order to increase document rendering speed at the expense of swath stitching quality and/or decreased sub-raster registration error correction resolution.

Associating 326 respective writing powers with each respective writing pass may also be done at system design time or provided as a field configuration selectable by the system user at installation or on a job-by-job basis. For instance, using different laser or writing powers for different respective passes can increase the number of sub-raster positions that can be emulated. For instance, where two writing passes are selected 322 to render each raster or line, associating one-third of the total writing power to be applied in the first pass and two-thirds of the total writing power to be applied in the second pass allows sub-raster displacements of one-third and two-thirds of a raster to be compensated for or emulated. On the other hand, applying the same writing power in each pass (e.g., one-half total power per pass) provides for a sub-raster spacing of one-half to be compensated for or emulated.

Determining 330 a registration error profile for the rendering device may be performed during a rendering device manufacture, during rendering device installation at a field location and/or periodically or as needed after the device is installed in the field location. For example, a test pattern may be printed on a sheet of print media, such as paper or vellum. The resulting print may be made available to a scanner of the system and/or analyzed at a separate station to determine registration errors or an error profile across the sheet of print media. For example, referring to FIG. 1, a registration error at pixel or block 142 might be considered to be one-third of a raster in a first direction, while the error at pixels or blocks 122 and 146 might be considered to be a whole raster and one-third raster in a second direction, respectively. The error at pixel or block 148 might be considered to be ½ raster in the second direction. Such errors are measurable with, for example, a document feeder and linear scanning array that is normally included on a photocopier for scanning documents to be copied.

The determination 330 of the registration error profile may in and of itself be considered a determination 334 of a compensation profile. Alternatively, as will be explained in greater detail below, determining 334 the compensation profile for the error profile of the rendering device may be based on a quantization associated with achievable or emulatable sub-raster positions. For example, where an error profile indicates a sub-raster registration error of one-third, determining 334 a compensation profile might include rounding that error up to one-half if, for example, a sub-raster position of one-half is emulatable in the target rendering device and a sub-raster position of one-third is not.

Figure 4:
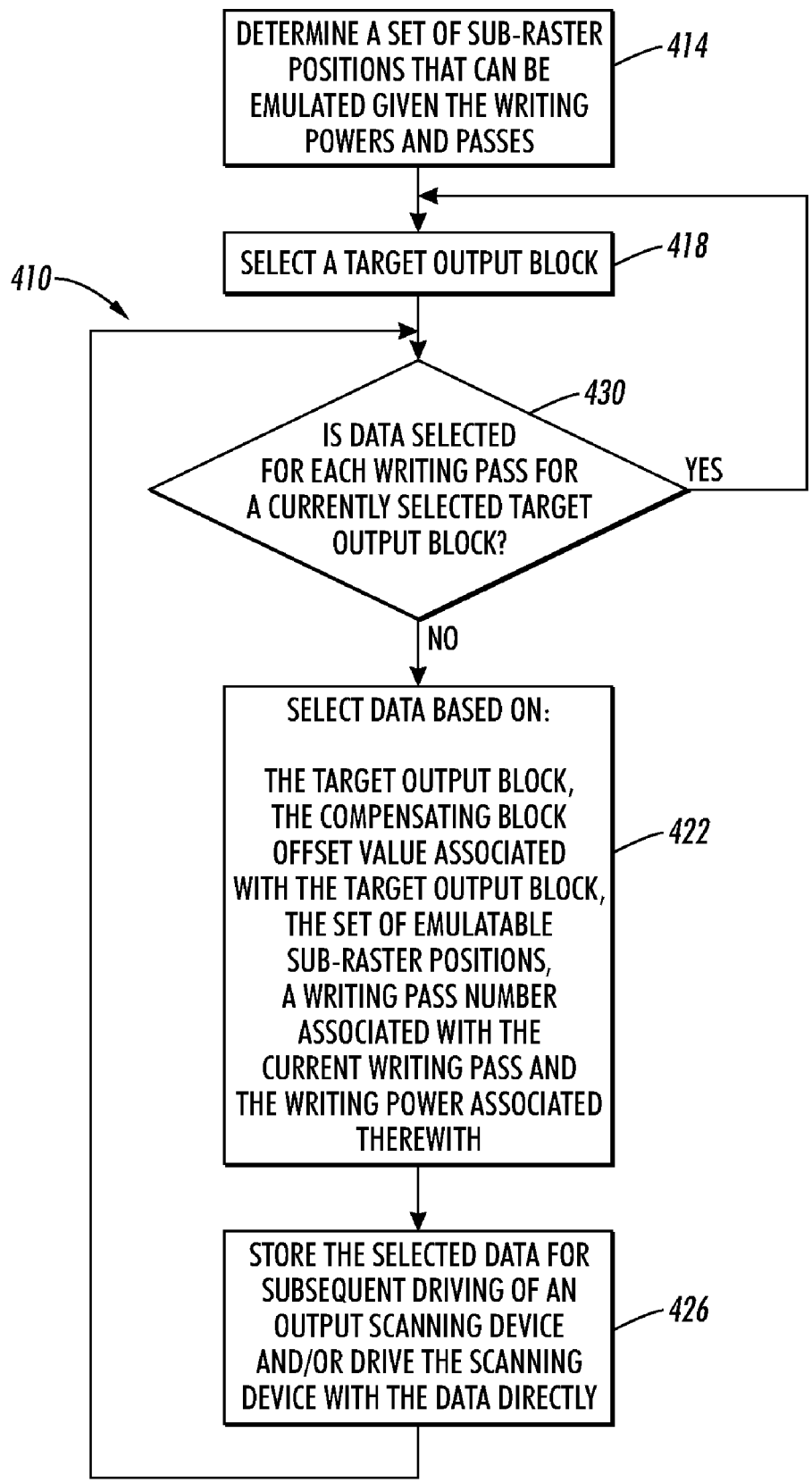
FIG. 4 is a flow chart outlining a method for compensating for registration errors.

Referring to FIG. 4, once the number of writing passes is selected 322 and respective writing powers are associated 326 therewith, a method 410 for providing rendering device registration error compensation for binary image data can include determining 414 a set of sub-raster positions that can be emulated given the writing powers and passes. Accordingly, in embodiments where a compensation profile is determined 334 based on quantizations according to emulatable sub-raster positions, the determination 334 might be made after the determination 414 of the set of sub-raster positions that can be emulated given the writing powers and passes.

As with the selection 322 of the number of writing passes and the association 326 of respective writing powers therewith, the determination 414 of the set of sub-raster positions can be made during system design, system manufacture, system initialization and/or whenever a new number of writing passes is selected or new writing powers are associated 326 with the selected 322 writing passes.

The method 410 may further include selecting 418 a target output block, selecting 422 data for the target output block based on the target output block, a compensating block offset value associated with the target output block, the set of emulatable sub-raster positions, a writing pass number associated with the current writing pass and/or the writing power associated therewith.

The selected 422 data is then stored 426 and/or used to drive the rendering device.

Figure 5:
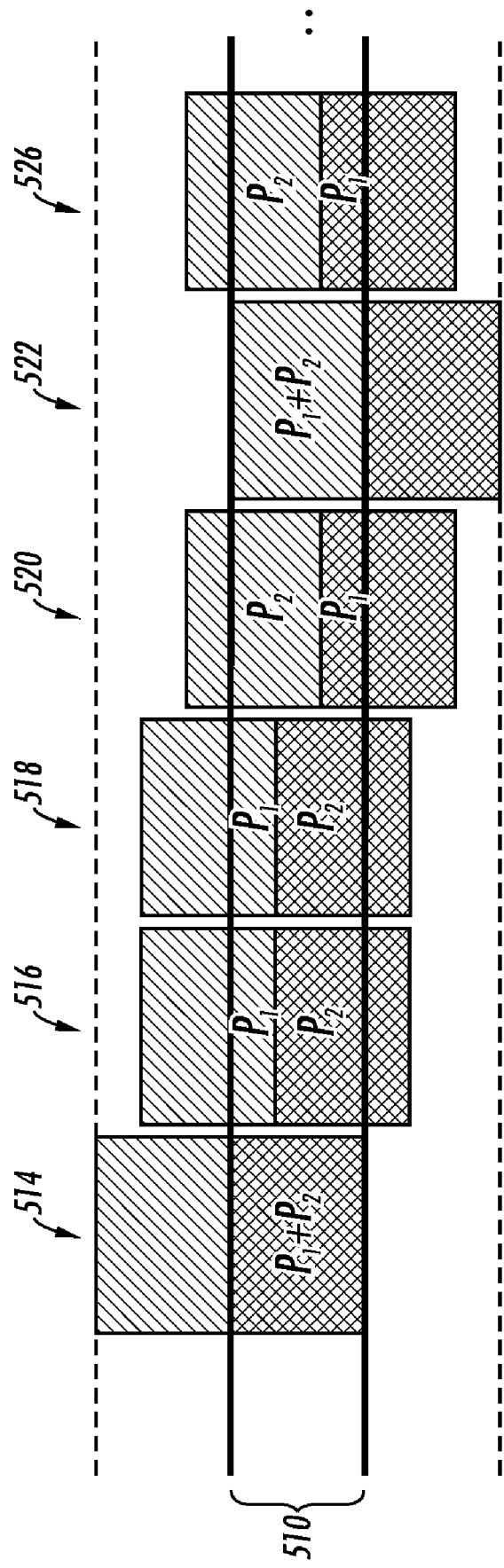
FIG. 5 depicts overwriting of image data to blocks of an output raster, wherein some blocks are redundantly overwritten and other blocks are non-redundantly overwritten.

For example, referring to FIG. 5, in a system wherein it has been selected 322 that rasters will be rendered with two writing passes and wherein writing powers of one-third and two-thirds of a total or maximum power are to be associated 326 with the respective first and second writing passes, ideally data from blocks of an input image raster associated with a target output image raster 510 would be written at respective block locations 514-526 of the output image raster 510 during both the first pass and the second pass as depicted at block 514. However, the system that renders the output image portion depicted in FIG. 5 exhibits a registration error that is similar to the registration error depicted in FIG. 1. Accordingly, compensation according to the method 410 described herein is desired.

In such a system, determining 414 the set of sub-raster positions that can be emulated given that the rendering device provides two writing passes, wherein one writing pass includes writing at one-third power and the other writing pass includes writing at two-thirds power, includes determining that writing data from the input image raster associated with the target output raster 510 at one power level during one writing pass and writing non-redundant (e.g., data from an adjacent raster) during the other writing pass and at the other power provides for emulating or estimating appropriate image data for intermediate or sub-raster positions. For instance, given the one-third and two-third power levels associated with respective first and second writing passes, writing data from respective adjacent input image rasters makes it possible to estimate or emulate appropriate data for positions one-third and two-thirds of the way between the adjacent rasters.

For example, as illustrated at block locations 516 and 518, data from the input image raster corresponding to the target output raster 510 could be written at the position that is actually illuminated by the laser or other output scanner during writing pass that is associated with two-thirds power. As further illustrated at block positions 516 and 518, data from an adjacent raster can be written during the writing pass associated with one-third power. The overall effect of this non-redundant overwriting or writing of data from different sources, such as, adjacent rasters, is to estimate or emulate image data at sub-raster positions, such as, for example, at a position one-third of the way between a target raster (e.g., 110) and an adjacent raster. For instance, since the beam or set of beams from a light source strikes photo-receptor about one-third of a raster higher than the ideal position at block locations 516 and 518, data is selected 422 so that data from the raster above the target location has one-third influence on lightness/darkness of the image at that location.

Figure 1:
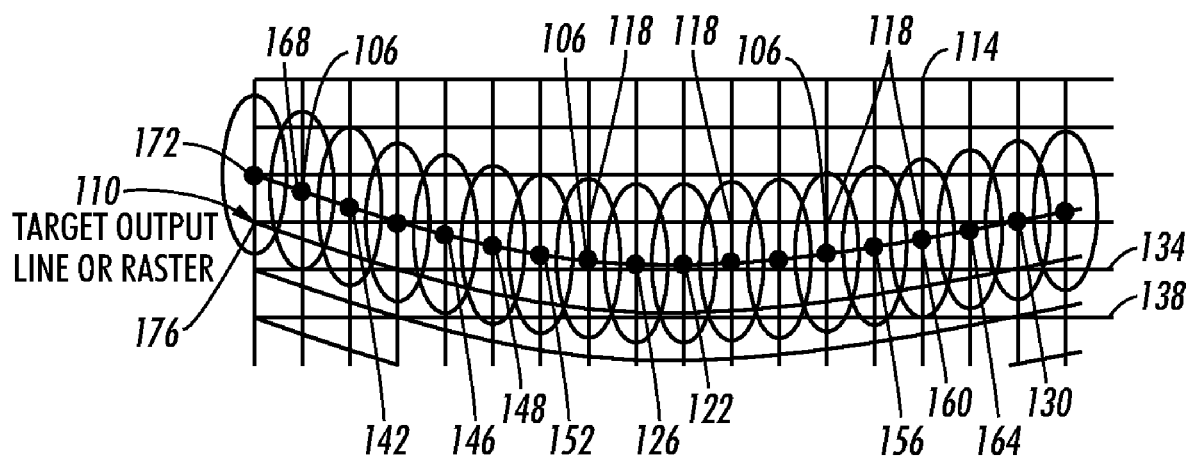
FIG. 1 depicts uncompensated bow type registration error.

For example, referring to FIG. 1, at position 142, an imaging element such as a raster output scanner or laser beam thereof exposes a portion of an imaging member at a point approximately one-third of a raster spacing above the target position of a target output line or raster 110. Accordingly, since the point is fairly close to its target position, it is appropriate to write input data associated with its target position at the offset position 142. However, since the position 142 is above its target position and, therefore, closer to the target position of the raster adjacent to and above the current target raster, it is also appropriate to write input data from the input raster that is adjacent and above the current target raster 110. Since the position 142 is closer to the target raster 110 than it is to the adjacent and above raster, it is appropriate that data from the input raster associated with the target raster 110 be written at a higher power than the data for the adjacent and above raster as depicted in FIG. 5 at pixel or block positions 516 and 518. This has the effect of emulating or estimating the appropriate data for the point that is actually exposed by the raster output scanner and tends to compensate for the registration error at point 142.

Referring again to FIG. 5, at pixel or block positions 520 and 526, input data normally associated with the target output raster 510 is illustrated as being written during the pass associated with one-third power and data from the adjacent (and above) raster is illustrated as being written during the past associated with two-thirds power. Writing data from adjacent rasters in this manner might be appropriate, for example, when a beam from an output scanner exhibits registration error that exposes a portion of an imaging member that is, for example, two-thirds of the way between raster positions, such as, for example, at point 168 in FIG. 1. Since point 168 is closer to the top raster position, it is appropriate that data from that raster be selected 422 for writing during the high power (e.g., two-thirds) pass because that raster should have a larger influence on the lightness or darkness at point 168 than should data associated with the target output raster 110.

Accordingly, as illustrated in FIG. 5, for the combination of two writing passes wherein one writing pass is written at one-third power and the other writing pass is written at two-thirds power, the determination 414 would be that sub-raster positions of one-third and two-thirds between rasters can be emulated. Other pass number and writing power combinations are possible and might provide other or similar sets of emulatable sub-raster positions. For example, analysis would determine 414 that a two-pass system wherein each pass is written with the same power (e.g., one-half total power), the set of emulatable sub-raster positions includes only the one-half sub-raster position.

A system that included three writing passes at the same power level would provide for a determination 414 that sub-raster positions of one-third and two-thirds could be emulated. This is because data from one raster could be written in two passes while data from the adjacent raster could be written in one pass thereby emulating data for the position that is closer to the raster that was written twice. Varying the power in three or more passes may provide for determinations 414 of sets that include additional and/or different emulatable sub-raster positions.

At pixel or block position 522, FIG. 5 depicts input data associated with a raster that is above or adjacent to the target raster 510 being written during both writing passes associated with writing data to the target raster 510. This is appropriate when registration error associated with a pixel or block of pixels has a magnitude of a whole raster position. For example, referring to FIG. 1, the registration error associated with position 172 indicates that the raster output scanner exposes a point that is a whole raster above the target raster line 110 when ideally it would be aiming at point 176. Accordingly, it would be appropriate to write data from the raster above the target raster 110 when the raster output scanner is intended to be exposing point 176 but is instead known to be exposing point 172.

Larger errors are compensated for in a similar manner. For example, registration errors of one and a third, one and two-thirds and two raster spacings are compensated for by selecting 422 data from input rasters that are one and two raster spacings offset from the input raster that would ideally be associated with the target output raster (e.g., 110, 510) in the two pass and one-third, two-third writing power example discussed above.

Accordingly, as indicated above, the method 410 includes selecting 422 data based on the target output block (e.g., 510: 514, 516, 518, 520, 522, 526), the compensating block offset value (determined 334 earlier) associated with the target output block, the set of emulatable sub-raster positions (determined 414 earlier), a writing pass number associated with the current writing pass and/or the writing power associated therewith, storing 426 the selected data for subsequent driving of an output scanning device and/or driving the scanning device with the data directly and determining 430 if data has been selected for each writing pass for a currently selected target output block.

The target output block (e.g., 110, 510) factors into the data selection 422 decision by indicating an associated input image data raster position or starting point for identifying the selected 422 data.

The compensating block offset value associated with the target output block is a value from the determined 334 compensation profile. For example, the compensation profile is stored as a vector or array of compensating block offset values associated with respective block positions (e.g., 514-526) of the output image and/or the input image data. As indicated above, compensating block offset values may be considered to include a whole raster part and a sub-raster part. Conceptually, the whole raster part can be used to generate an offset to a pointer identifying the input image data that would normally be associated with the current target output image raster. We refer to the input image raster identified by this combination of the offset value generated from the compensating block offset value and the pointer value identifying an input image raster normally associated with the target output raster as the coarse compensation raster. Fine compensation is provided by using the compensating block offset value to generate or identify a selection pattern indicating whether data should be selected for the current pass from the coarse compensation raster or from an input raster that is adjacent to the coarse compensation raster.

Figure 6:
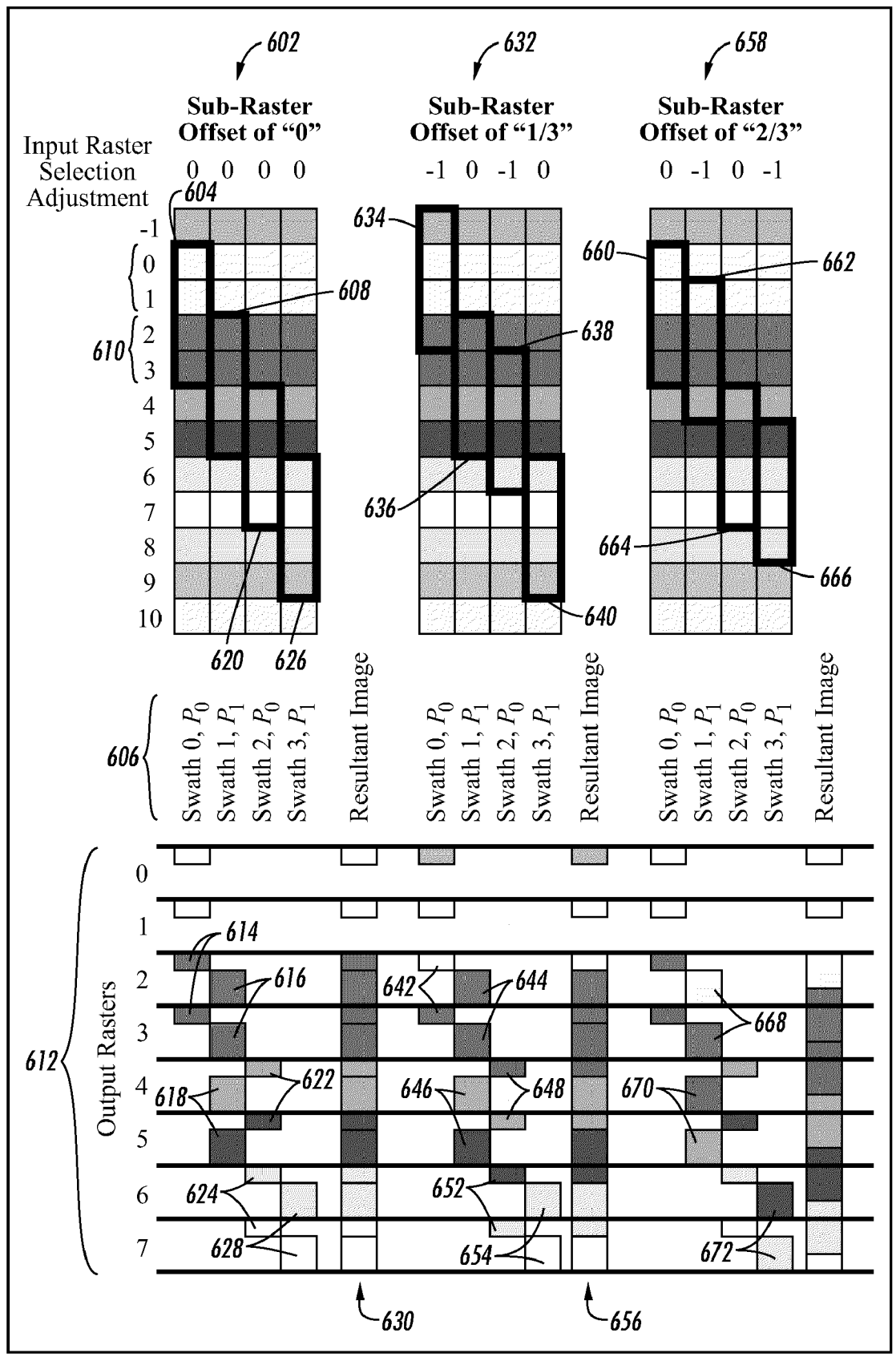
FIG. 6 depicts overwriting of image data to achieve zero, one-third and two-thirds of a raster spacing compensation or emulation.

For example, referring to FIG. 6, a first swath alignment diagram 602 depicts data selection 422 under the circumstance of a sub-raster offset or sub-raster portion of the compensating block offset value being zero. For simplicity, the depicted swaths are four rasters wide (e.g., for an illustrative system based on four laser beams). However, as is noted above with regard to FIG. 2, swaths including many more (e.g, 32) or fewer (e.g., 1) rasters are contemplated. The data selection 422 diagram 602 depicts four columns of data. However, the same data is represented in each column. That is, for example, the columns can be thought of as representing a first column of input image data at four points in time or during the data selection 422 for four different swaths. For example, a first data selection box 604 illustrates the selection 422 of data from rasters 0-3. As depicted at a swath/power label portion 606 of the data selection 422 diagram 602, the data selection box 604 is associated with swath 0 and writing power $P_0$. Since the sub-raster offset associated with the depicted swaths is 0, data selection 422 is similar to that depicted and described with reference to FIG. 2. A second data selection box 608 is associated with a second swath (Swath 1) and a second writing power $P_1$. Just as redundant data 208 was selected for overwriting in the first two swaths 202, 212 discussed in reference to FIG. 2, redundant data is selected from input image rasters 2 and 3 as depicted at 610. As shown in the output raster diagram 612 portion of FIG. 6, the data 614 included in data selection box 604 from rasters 2 and 3 is written during swath 0 at $P_0$ (i.e., one-third power). That data 614 is overwritten with redundant data 616 selected 422 in the second selection box 608 from rasters 2 and 3. The lower portion of the swath associated with selection box 608 includes data from input image data rasters 4 and 5. That data 618 is also written at power $P_1$ (e.g, two-thirds) as part of Swath 1.

A third data selection 422 box 620 illustrates the data selected for a third swath (i.e., Swath 2). The selected 422 data includes a redundant selection of data from input image rasters 4 and 5 as well as a first selection of input image data from rasters 6 and 7. As depicted at 622, the redundant data from rasters 4 and 5 is redundantly overwritten on or with the data 618 at output rasters 4 and 5. The data from rasters 4 and 5 is redundantly written (622) at power level $P_0$ (e.g., one-third) as part of Swath 2.

Also written at power level $P_0$ as part of Swath 2 is the first pass of the data from rasters 6 and 7 (at 624). A fourth data selection 422 box 426 redundantly selects data from rasters 6 and 7 which is shown as being overwritten with the data 624 (at 628).

As depicted at 630, the sub-raster offset of 0 results in a redundant overwriting of data so that each output raster is rendered with two passes of data from the same raster.

When the sub-raster offset is non-zero, the data selection 422 provides for non-redundant data selection and non-redundant overwriting.

For example, a second data selection diagram 632 is associated (by a determined 334 compensation profile) with a sub-raster offset of one-third (e.g., see FIG. 1, 142). The second data selection 422 diagram 632 includes fifth, sixth, seventh and eighth (634, 636, 638, 640) data selection boxes. The fifth 634 and seventh 638 data selection boxes are associated with low power (e.g., $P_0$; one-third) writing passes (e.g., Swath 0 and Swath 2) and depict data selections that are offset by one raster position as compared to data selection boxes 604 and 620 discussed above with reference to the 0 sub-raster offset condition. The sixth 636 and eighth 640 data selection boxes are associated with high power (i.e., $P_1$; two-thirds) passes and depict data selections that are not offset from related Swath 1 and Swath 3 data selection boxes 608, 626 of the 0 sub-raster offset condition.

While the fifth and seventh (422, 634, 638) data selections are offset, the writing passes are not. That is, data from the first two rasters of the sixth data selection box 636 is overwritten on or with data from the last two rasters (or last half) of the fifth data selection box 634. Accordingly, data from input image rasters 1 and 2 selected in the last half of the fifth data selection box 634 is depicted as being written (642) at power $P_0$ (e.g., one-third) during Swath 0. This data is non-redundantly overwritten by data selected by the first half of the sixth data selection box 636 from input image rasters 2 and 3 as depicted at 644 in Swath 1 at high power (e.g., two-thirds). Also written during the first Swath (of the second example), at high power, and depicted at 646 is data selected 422 in the second or lower half of data selection box 636 from input image rasters 4 and 5. This data is over written or combined with non-redundant data 648 selected 422 for Swath 2 in the first or upper portion of the offset seventh data selection box 638. Also selected for low-power Swath 2 in the second or lower portion of the offset selection seventh data box 638 is data from input image rasters 5 and 6. As depicted at 652, this data is written in Swath 2, at low power, to output rasters 6 and 7. As depicted at 654, this data is overwritten at high power in Swath 3 with data from the first or upper portion of eighth data selection box 640 with data from input image rasters 6 and 7.

As illustrated at 656, the result of offsetting the data selection boxes 634 and 638 for the low-power passes is to bring the influence on lightness or darkness from input image raster 1 slightly into the writing pass for output raster 2. Similarly, input image data rasters 2-6 influence the image data written in output rasters 3-7. Since, as depicted in FIG. 1, the data was selected 422 to compensate for a registration error such as depicted at 142 wherein an output scanner exposes an imaging member at a point higher in the image than ideally intended, the overall effect of moving the influence of image data from earlier or higher input image data rasters into lower or subsequent image rasters is to compensate for the sub-raster offset or registration error depicted at 142 and to tend to return appropriate lightness or darkness of an image portion to its appropriate location.

Larger sub-raster offsets, such as depicted at 168 in FIG. 1, can be compensated for by increasing the influence of the adjacent raster that is closer to the actual exposure point (e.g., 168). That is, for example, data from the closer raster is selected for more or a higher proportion of the passes and/or for the higher power passes.

For example, a third data selection 422 diagram 658 depicts ninth, tenth, eleventh and twelfth data selection boxes 660-666 wherein it is the tenth 662 and twelfth 666 data selection boxes, which are associated with high power (e.g., $P_1$; two-thirds) Swaths 1 and 3, that are offset relative to their 0 sub-raster offset counterparts 608, 626. Accordingly, as depicted at 668-672, the influence of input image rasters 1-6 is included in target output rasters 2-7 during high power (e.g., $P_1$; two-thirds) Swaths 1 and 3 instead of during low-power (e.g., $P_0$; one-third) Swaths 0 and 2, as depicted in the second data selection diagram 632. Therefore, the lightness or darkness of the upper or earlier input image rasters has a greater influence on the data that is written during the swaths associated with the target output rasters 2-7, and compensation for larger sub-raster registration errors, such as depicted at 168 in FIG. 1, is provided.

In summary, both the second 632 and third 658 data selection diagrams illustrate selecting 422 data from an input raster that is associated with a target output raster position that is adjacent to and relatively close to the sub-raster position (e.g., 142, 168) of a mis-registered laser beam or other writing element when the writing pass for which data is being selected 422 is associated with a relatively high target writing power (from the set of available target writing powers) and selecting data from an input raster that is associated with a target output raster position that is adjacent to and relatively far from the sub-raster position (e.g., 142, 168) when the target writing pass for which data is being selected 422 is associated with a relatively low writing power. That is, for the relatively small registration error from the target raster as depicted at 142, data for the high-power swaths was selected 422 with selection boxes 636, 640, from the target rasters (i.e., 2-5 and 6 and 7, respectively) for the high-power Swaths 1 and 3. The third data selection diagram 658, as indicated above, selects data from the adjacent raster (i.e., 1-4 and 6 and 7, respectively) that is closer to the sub-raster offset position (e.g., 168) actually exposed by the output scanner as depicted with selection boxes 662 and 666 for the high-power swaths (i.e., Swaths 1 and 3).

As indicated above, some embodiments may include or provide for more than two passes. In some of those embodiments, all the passes may be associated with the same writing power. Accordingly, the influence of a particular raster (i.e., the input raster that is associated with an output raster that is physically closer to the actual position illuminated by the output scanner) can be increased by selecting 422 data from that raster for more passes than from an adjacent raster. For example, in a system where each raster is written with four passes, each pass accounting for one-quarter of the exposure (e.g., one-quarter power), a registration error of three-quarters of a raster position may be compensated for by selecting data from the input raster that would be ideally associated with the output raster that is closer to the actual exposed position for three of the four passes. That is, selecting 422 data can include selecting data from an input raster that is associated with a target output raster position that is adjacent to and relatively close to the sub-raster position (i.e., of an exposed point associated with registration error) for a relatively higher fraction of the selected number of respective enumerated writing passes and selecting data from an input raster that is associated with a target output raster position that is adjacent to but relatively far from the sub-raster position for a relatively lower fraction than the selected number of respective enumerated writing passes.

Some embodiments can compensate for sub-raster portions of registration error that are approximately equidistant or between adjacent rasters. Accordingly, selecting 422 data can include selecting data from a first input raster that is associated with a target raster position that is adjacent to a first side of the sub-raster position (i.e., of the misregistered scanning device exposure when the enumerated writing pass is a first writing pass and selecting data from a second input raster that is associated with a target raster position that is adjacent to a second side of the sub-raster position when the enumerated writing pass is a second writing pass. For example, this is appropriate when the first and second input rasters are associated with first and second target raster positions that are approximately equidistant from the sub-raster position and wherein the first and second writing passes are associated with equal or approximately equal target writing powers.

Data selection 422 patterns such as those described above (e.g., 602, 632, 658) may be determined by inspection by systems designers at system design time and stored or incorporated in a system for later access by the system based on the compensating block offset value associated with a target block, the number of writing passes and the writing power associated with those passes and the emulatable sub-raster positions. Alternatively, an analytical approach can be applied to determine appropriate data selections 422.

For example:
Let:
i=raster line number
j=pixel number
B(1, i, j)=Output bit written on actual raster and pixel position (i, j) with pass (power) 1
B(2, i, j)=Output bit written on actual raster and pixel position (i, j) with pass (power)2
$B_0$(i, j)=Input bit on ideal raster and pixel position (i, j)
d(i, j)=displacement error for pixel i, j=raster spacing
n=integer indicating the raster line to draw from, referenced from the current line i. n varies depending on d(i, j), hence it has an (i, j) dependence. In the formulas below, that dependence isn't written explicitly to simplify the appearance of the formulas, but it is assumed. While d is a representation of displacement error, n is a representation of the correction function (correction profile). Note that for both d and n, several possible representations could be used depending on the electronic implementation and the particular type of displacement error. For instance, these profiles could be represented as referenced from a common origin or in terms of local differences. The dependence could be on i, or j or both i and j. They could be stored at pixel and raster resolution, or they could be at a block resolution.

Assumptions
For equal-power overwrite, Power1=Power2
For ⅓-power overwrite, Power1=Power2/2

$$\Delta' = \text{sub-raster spacing}$$
$$= \Delta/2 \text{ for equal-power Overwrite} - 2$$
$$= \Delta/3 \text{ for } 1/3\text{-power Overwrite} - 2$$

Note that the (i, j) dependence of d is not shown in all formulas, but is assumed.

Figure 7:
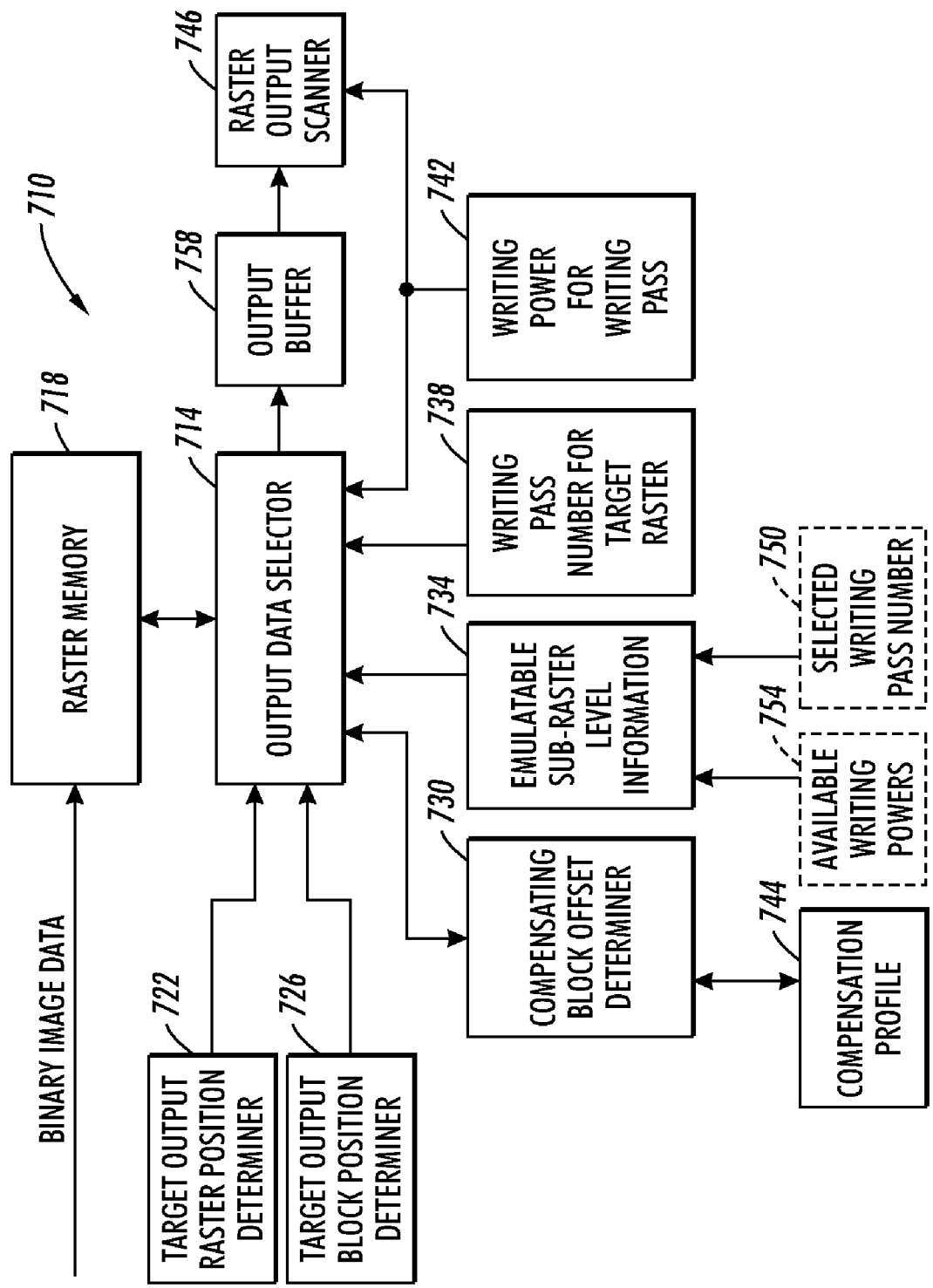
FIG. 7 is a block diagram of a system that is operative to perform embodiments of the method of FIG. 4.

Formulae for Equi-Power Non-Redundant Overwriting $B(1, i, j) = B_0(i+n, j)$ for $(-\frac{1}{4}+n)\Delta \leq d \leq (\frac{3}{4}+n)\Delta$, equivalently $d/\Delta - \frac{3}{4} \leq n \leq \frac{1}{4} + d/\Delta$ Or $n = \text{FLOOR}[\frac{1}{4} + d/\Delta] = \text{CEIL}[d/\Delta - \frac{3}{4}]$ $B(2, i, j) = B_0(i+n, j)$ for $(-\frac{3}{4}+n)\Delta \leq d \leq (\frac{1}{4}+n)\Delta$, equivalently $d/\Delta - \frac{1}{4} \leq n \leq \frac{3}{4} + d/\Delta$ Or $n = \text{FLOOR}[\frac{3}{4} + d/\Delta] = \text{CEIL}[d/\Delta - \frac{1}{4}]$ Formulae for 2-Level ⅓-Power Non-Redundant Overwriting $B(1, i, j) = B_0(i+n, j)$ for $(-\frac{1}{6}+n)\Delta \leq d \leq (\frac{1}{6}+n)\Delta$ $B(1, i, j) = B_0(i+n+1, j)$ for $(\frac{1}{6}+n)\Delta \leq d \leq (\frac{3}{6}+n)\Delta$ $B(1, i, j) = B_0(i+n, j)$ for $(\frac{3}{6}+n)\Delta \leq d \leq (\frac{5}{6}+n)\Delta$ $B(2, i, j) = B_0(i+n, j)$ for $(-\frac{1}{6}+n)\Delta \leq d \leq (\frac{3}{6}+n)\Delta$ $B(2, i, j) = B_0(i+n+1, j)$ for $(\frac{3}{6}+n)\Delta \leq d \leq (\frac{5}{6}+n)\Delta$ Or, equivalently $B(1, i, j) = B_0(i+n, j)$ for $d/\Delta - \frac{1}{6} \leq n \leq d/\Delta + \frac{1}{6}$ $B(1, i, j) = B_0(i+n-1, j)$ for $d/\Delta - \frac{3}{6} \leq n \leq d/\Delta + \frac{1}{6}$ $B(1, i, j) = B_0(i+n, j)$ for $d/\Delta - \frac{5}{6} \leq n \leq d/\Delta + \frac{3}{6}$ $B(2, i, j) = B_0(i+n, j)$ for $d/\Delta - \frac{3}{6} \leq n \leq d/\Delta + \frac{1}{6}$ $B(2, i, j) = B_0(i+n+1, j)$ for $d/\Delta - \frac{5}{6} \leq n \leq d/\Delta + \frac{3}{6}$ Referring to FIG. 7, a system 710 for providing rendering device registration error compensation for binary image data can include an output data selector 714 and a raster memory 718. For example, the output data selector 714 can select 422 data on the basis of information received from a target output raster position determiner 722, a target output block position determiner 726, a compensating block offset determiner 730, an emulatable sub-raster level information source 734, a writing pass number for a target raster 738 and a writing power 742 for the writing pass.

For instance, the target output raster position determiner 722 identifies an output raster (e.g., 110, 510) or set of output rasters for which output data is to be selected 422. The target output block position determiner 726 identifies a pixel or block or set of pixels (e.g., one of 514-526) within the raster or rasters (e.g., 110, 510) identified by the target output raster positioned determiner 720 for which the output data is to be selected 422. That is, for example, the target output raster position determiner 722 determines the position of an output raster in a slow scan or "y" direction of interest in an output image while the target output block position determiner 726 determines a position of data of interest in a fast scan or "x" direction. The output data selector 714 selects 422 data to compensate for registration errors in the slow scan direction that may vary as position changes in the "x" or fast scan direction (e.g., see FIG. 1). The target output raster position helps identify an input raster that is normally associated with the output raster and from which coarse offsets may be applied in order to identify adjacent rasters from which data is to be selected 422 to compensate for coarse and sub-raster registration error components, as described above. The target output block position (e.g., one of 514-526) identifies the point across the page for which output data is to be selected 422. Accordingly, the target output block position can be used as an index or to otherwise identify a compensating block offset value from a compensating or error profile 750 provided by the compensating block offset determiner 730.

For instance, the compensating block offset determiner 730 may participate in a calibration or analysis of a calibration image rendered through the services of an associated rendering device or raster output scanner 746 for registration errors of which compensation is sought. For instance, the registration error of the associated raster output scanner 746 varies in the fast scan direction or across a printed page but that variation is the same for all rasters from the top of the page to the bottom (e.g., see the plurality of bowed lines in FIG. 1). Each raster is conceptually divided into a set of blocks. A block can include one or more pixels of a raster as described above, a block size of 128 pixels is contemplated as convenient for compensating for errors in at least one marking engine design. Across a rendered image, a raster might include, for example, forty blocks.

Accordingly, the compensating block offset determiner 730 may determine 330 and/or store an error profile or vector of errors or offsets on a block-by-block basis recording registration errors of the associated raster output scanner or rendering device 746 for each block position across an imaging member or page.

In some embodiments, the vector or profile may store errors or offsets relative to the ideal position of each block. Other embodiments may store such an absolute error for a first block with the errors associated with subsequent blocks being stored as offsets from the error associated with a previous block.

For instance, the error profile or a compensation profile determined 334 from the error profile can be stored as a series of respective offset changes associated with a series of respective sequential block positions, each respective offset change being relative to an offset associated with an immediately preceding block position. That is, an absolute offset is associated with a first block position (e.g., 514) and a first element of the series of respective offset changes is associated with a second block position (e.g., 518) and is relative to the initial absolute offset.

In such embodiments, selecting 422 data can include determining an uncompensated input image data address (in an input image memory) associated with the currently selected target output image block, determining a number of address locations associated with a full raster line, thereby determining a raster line offset address, calculating a compensation offset value based on the initial absolute offset and, if appropriate, selected ones of the series of respective offset changes, wherein selected ones of the series of respective offset changes are appropriately selected if a position of the target output block image is other than the first block position and wherein the appropriately selected respective offset changes include the respective offset change associated with the block position of the target output image block and respective offset changes associated with any block positions between the target output image block and the block position of a raster associated with the target output image block. For instance, the calculation can include an arithmetic combination of the initial absolute offset and any appropriately selected respective offset changes. For example, the arithmetic combination can include adding and subtracting values of offset changes, as appropriate, depending on the signs of the offsets. Such embodiments may have advantages in reduced data storage requirement. For instance, it is likely that representing absolute registration errors would require more data bit storage than would storing small changes in registration error from one block to another.

The emulatable sub-raster level information 734 can be in the form of the selected 322 number of writing passes 750 and the respective writing powers 754 associated 326 therewith. Alternatively, those pieces of information can be used to determine 414 the set of emulatable sub-rasters. In whatever form it takes, the emulatable sub-raster level information 734 is made available to the output data selector 714.

In some embodiments, the emulatable sub-raster level information 734 is made available either directly or indirectly to the compensating block offset determiner. For instance, during a calibration phase, when the compensation profile is being determined 334, the determined 330 registration error profile is considered in light of the emulatable sub-raster level information 734. For instance, registration error information is quantized according to the emulatable sub-raster level information. That is, registration errors are rounded up or down to the nearest whole or emulatable sub-raster value and stored as part of the compensation profile 744 or otherwise used to generate the compensation profile 744.

In other embodiments, the compensation profile 744 is based on the unquantized or higher resolution registration error profile determination 330 and the output data selector quantizes the compensation profile 744 according to the emulatable sub-raster information 734 at run time.

In operation, when binary image data is made available in the raster memory 718, the target output raster determiner 722 and the target output block position determiner 726 operate to select 418 a target output block. For example, a first block of a first raster of an output image might be selected, and this information is made available to the output data selector. Since the compensation profile 744 is likely the same for every raster, in the illustrated embodiment 710, the compensating block offset determiner 730 need only receive block position information from the target output block position determiner 726 as an index, or for determining an index, into the compensation profile 744.

The output data selector 714 receives a compensation profile value or offset from the compensating block offset determiner 730 and, based on that information, as well as the emulatable sub-raster level information 734, a writing pass number 738 and/or as a surrogate therefor, a writing power 742, for the current writing pass and uses this information to select 422 data from the raster memory 718 to be delivered to an output buffer 748 for storage 426 therein or to be delivered directly to the associated raster output scanner 746 to be used in rendering a rendered version of the binary image data.

For instance, if it was determined 330 that there is no error for the first block, the output data selector 714 selects 422 image data directly corresponding to the target output raster.

If it was determined 330 that the first block is associated with a registration error for which a non-zero compensation value is appropriate, then the compensation profile 744 includes such a non-zero compensation value determined 334 for the first block.

If the determined 334 non-zero compensation value from the compensation profile 744 includes a non-zero whole raster part, the output data selector 714 uses the non-zero whole raster part as an offset to access input image data from an input image raster that is offset from the raster normally associated with the target output raster by an amount corresponding to the whole raster portion of the value from the compensation profile 744.

If the value from the compensation profile 744 includes a non-zero sub-raster portion, the output data selector 714 identifies two adjacent rasters from which data can be alternately selected based on the writing pass number 738 and/or writing power 742 for the writing pass.

For example, the data is alternately selected from the input image raster identified according to the whole raster portion of the value from the compensation profile 744 and an adjacent imput image raster.

For instance, as described with reference to FIG. 5 and FIG. 6, if the value from the compensation profile 744 provided by the compensating block offset determiner 730 includes a sub-raster portion of 0, then the output data selector 714 selects 422 data from the input image raster that was identified from the coarse portion of the value from the compensation profile and the output raster position provided by the target output raster position determiner 722 for all the writing passes of the number of writing passes selected 322 for rendering the image using the associated raster output scanner 746 (e.g., 514, 522, 602).

If, on the other hand, the value from the compensation profile 744 received from the compensating block offset determiner 730 includes a non-zero sub-raster portion, then the output data selector 714 selects 422 data alternately from a first input image raster (e.g., the input image raster identified by the combination of the coarse portion of the value from the compensation profile and the target output raster position) and a second input image raster (e.g., an input image raster that is adjacent the first input image raster) according to a selection pattern that is appropriate given the value of the sub-raster portion of the value from the compensation profile 744 (e.g., 516, 518; 632; 520, 526; 658). That is, the output data selector 714 selects data for a current pass (e.g., 738) in anticipation of combining it through non-redundant overwriting with data selected for another pass so that the written information is more appropriate to the position one or more writing elements (e.g., laser beams) actually write information due to registration errors than writing data from an input image raster directly associated with the target output raster would be. For instance, the output data selector 714 selects 422 data from the adjacent input image rasters for the current writing pass according to a writing power weighted proportion. Data is selected from the raster that is associated with the position that is closest to the sub-raster position predicted to be exposed or written to by the mis-registered writing element for more writing passes or for writing passes that are associated with a higher power, or some combination thereof. When sub-raster positions midway between two rasters are emulatable (414, 734), data is selected from the adjacent input image rasters in approximately equal writing power weighted portions.

Figure 8:
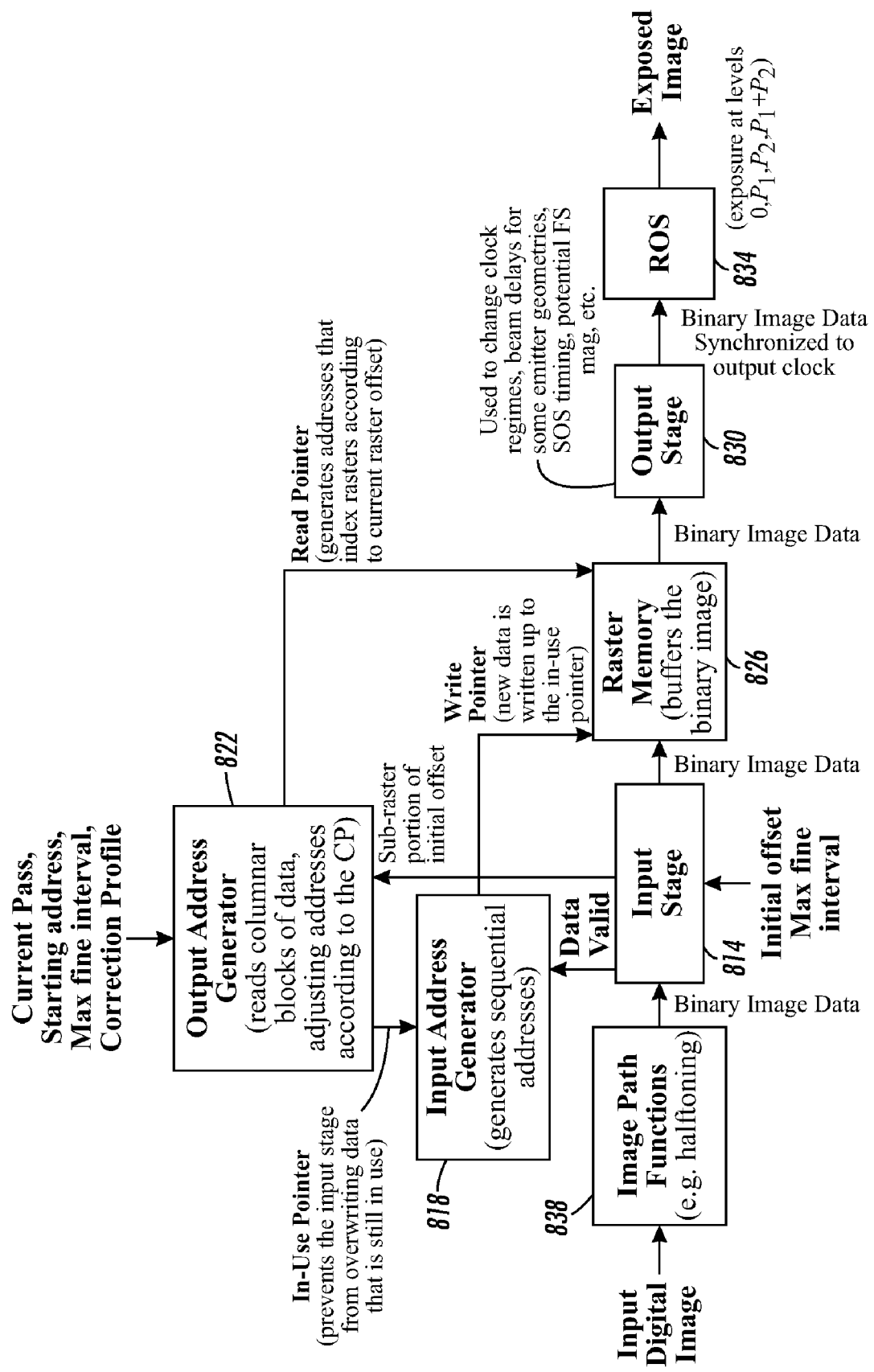
FIG. 8 is a block diagram of an embodiment of aspects of the system of FIG. 7.

Referring to FIG. 8, in some embodiments, the output data selector 714 is considered to include an input stage 814, an input address generator (IAG) 818 and an output address generator (OAG) 822. The input stage 814, input address generator 818 and output address generator 822 each communicate with a raster memory 826. An output stage 830 receives image information from the raster memory and buffers it for delivery to an output device such as a raster output scanner (ROS) 834. The input stage 814 receives binary image data from image path functions 838 of an image processing system. For example, image path functions can include halftoning, error diffusion, rank order error diffusion and other image processing or image authoring processes that provide image information in the form of marking decisions or binary image data.

Input Stage

Referring to FIG. 8, the input stage 814 is responsible for requesting data from the image path functions, receiving it and appropriately writing it into raster memory 826. It is also responsible for computing and inserting some number of blank rasters into raster memory 826 before requesting data from the upstream image path.

Initial Offset

There are several sources that contribute to an initial offset of each image. There is a dynamic component calculated upon receipt of pagesync signals to correct for the asynchronous nature of pagesync and Start of Swath (SOS) signals. The purpose of this initial offset is to provide a consistent starting location for each image. In such embodiments, it is helpful to be aware of the fact that the target media is moving at a well-controlled amount during each SOS cycle (e.g., a distance equivalent of 16 rasters for our 32 laser, overwriting system such as discussed above with reference to FIG. 2).

In some embodiments, a static offset is specified for use in aligning data in the process direction. For instance, this is useful in a multi-ROS system. The static offset value can be computed by marking the photoreceptor with a special diagnostic pattern and computing an appropriate process direction shift needed to align multiple channels (e.g., separations or colors).

The initial offset of pixel block 0 is the last component of initial offset. This value is correction profile dependant and computed for each profile (e.g., during re-calibrations).

The computation of initial offset should separate those aspects of positioning that can be done by skipping SOSs from those that must have rasters inserted into memory (or some read delay mechanism on the output side, avoiding using raster memory for initial offset). This is a raster memory optimization to take advantage of the fact that skipping an SOS is equivalent to offsetting the start of image by a fixed number of rasters The following equations indicate how an initial offset can be determined:

$$\text{non\_profile\_offset} = \text{dynamic\_registration} + \text{static\_registration}$$

$$\text{non\_profile\_fine} = \text{remainder}(\text{non\_profile\_offset}, \text{max\_fine\_offset})$$

$$\text{non\_profile\_coarse} = \text{quotient}(\text{non\_profile\_offset}, \text{max\_fine\_offset})$$

$$\text{temp} = \text{non\_profile\_fine} + \text{static\_profile\_fine}$$

$$\text{total\_fine\_offset\_carry} = \text{quotient}(\text{temp}, \text{max\_fine\_offset})$$

$$\text{total\_fine\_offset} = \text{remainder}(\text{temp}, \text{max\_fine\_offset})$$

$$\text{sos\_skip\_quotient} = \text{quotient}(\text{non\_profile\_coarse}, \text{rasters\_per\_sos})$$

$$\text{sos\_skip\_remainder} = \text{remainder}(\text{non\_profile\_coarse}, \text{rasters\_per\_sos})$$

initial_offset_fine=total_fine_offset sos_skip_count=sos_skip_quotient blank_rasters_to_insert=sos_skip_remainder+pre_image_rasters+ static_profile_coarse+total_fine_offset_carry+1

Notes:
1. static_profile_coarse and static_profile_fine are correction profile dependant and represent the initial offset of pixel block 0.

Writing Raster Memory

The input stage 814 causes data to be written into raster memory 826. The data written into raster memory may be sourced from a constant (set to background) or from the upstream data path input. As discussed above with reference to FIG. 7, there are a number of reasons blank or background rasters need to be inserted before transferring data from upstream. A list of these reasons follows:
1. The number of rasters that could be skipped using SOS was not evenly divisible by the number of rasters imaged per SOS.
2. Pre-image rasters must be inserted for certain correction or compensation profiles that require data to be read from an area in memory that would otherwise be undefined for the current swath.
3. A number of rasters must be inserted before the image to allow for offsets in pixel block 0 when using a correction profile.
4. A single raster is always forced into memory for those situations where there is a fine shift caused by dynamic offset calculation.

The input stage 814 transfers whole rasters at a time, regardless of the source. When transferring blank or background rasters, a transfer counter is loaded with the raster length (e.g., in pixels or blocks or memory words) and that number of transfers is performed using the constant data source. When transferring from the image path function 838, the transfer counter is loaded, a line request is sent and data is then transferred upon assertion of a valid data indicator.

For each write to raster memory, the input address generator 818 moves to the next address in memory. Receipt of a pagesync signal (not shown) typically resets the entire datapath, returning all components to their initial state.

Output Address Generator

The output address generator (OAG) 822 produces addresses into raster memory in a manner that provides the cross-process positional adjustments of data discussed above with regard to the output data selection 422 for use as video as the associated raster output scanner 834 sweeps across the photo receptor or print media in a process direction. As indicated above, the positional adjustments occur at the granularity of a pixel block.

The OAG 822 can use a random access memory (RAM) that is intended to contain a profile (e.g., 744). The OAG 822 maintains a read address for the profile RAM that resets to the beginning of the profile RAM at the start of every swath. In some embodiments, the OAG 822 increments the profile read address after reading an entire column (e.g., for an entire image) of pixel blocks but before the start of a read of the next column of pixel blocks.

In this embodiment, the correction profile contains a sequence of relative, sub-raster offsets that cover the entire width of a scanned raster. Each profile entry describes the next sub-raster adjustment to be applied to the current sub-raster offset, one for each pixel block. The current sub-raster offset, once computed, remains unchanged for the entire column of pixel blocks read. Due to this repetitious reset and increment scheme, all pixel blocks at a given offset from the beginning of a swath will always have the same sub-raster offset across multiple swaths. In this way, an entire column of pixel blocks maintains a fixed sub-raster offset for the entire height of an image produced by the ROS on the print media.

The OAG 822 uses the current sub-raster offset to determine how to read from raster memory (e.g., see FIG. 6). The OAG 822 also keeps track of a swath starting address which is used to load a base address register at the start of each swath. For example, the swath starting address would be incremented by two for a four laser array, and would be incremented by 16 for a 32 laser beam's system, when performing 2-pass overwrite from swath to swath (e.g., FIG. 2).

The OAG 822 applies an adjustment to the current base address based on the current sub-raster offset. FIG. 6 illustrates this behavior and shows the base address adjustment made on each pass. The adjustments shown should be multiplied by the raster width, e.g., an adjustment of "−1" would require subtraction of an entire raster width from the current base address. As profile RAM adjustments are made, the current sub-raster offset may overflow or underflow, requiring a whole raster adjustment to the base address.

Some embodiments insert enough blank rasters into raster memory 826 to handle the largest accumulated negative base address shift. Other embodiments detect when the base address goes negative and synthesize blank data instead of requiring extra rasters to be written to raster memory.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. While issues of color have not been directly addressed, the methods and systems are applicable to image data and registration errors associated with various color separations. While reference has been made to laser based raster output scanners or rendering devices, the methods and systems are applicable to raster output scanning devices of other technologies including but not limited to ink jet, cathode ray, light emitting diode electron beam and other scanning technologies.

The invention claimed is:
1. A method for providing rendering device registration error compensation for binary image data to be rendered by an associated rendering device, the method comprising:
structuring the binary image data as pixels arranged in raster lines;
structuring a set of one or more of the raster lines as a set of blocks of one or more of the pixels;
selecting a number of writing passes to be used in rendering each raster line and therefore, in rendering each block, wherein the selected number is an integer having a value of two or greater;
associating respective target writing powers from a set of available writing powers with each respective one of the selected number of writing passes;
determining a set of sub-raster positions that can be emulated given the selected number of writing passes and the respective target writing powers associated with each respective writing pass;
determining a raster line registration error profile for the rendering device;

determining a compensation profile for the rendering device based on the raster line registration error profile wherein each respective block in the set of blocks of one or more raster lines is associated with a respective compensating raster offset value; and for each writing pass associated with a currently selected target output block preparing to render the currently selected target output block by:

selecting data from the binary image data based on a target output position associated with the currently selected target output block, the compensating block offset value for the target output block, the set of emulatable sub-raster positions, a writing pass number associated with a current writing pass and the respective target writing power associated with the current writing pass, wherein image data from respective adjacent rasters is selected based on the compensating block offset, wherein a sub-raster spacing correction determined from the compensating block offset value and the set of emulatable sub-raster positions is emulated by selecting data from respective adjacent rasters according to the target writing power and/or writing pass number associated with the current writing pass; and at least one of storing the selected data for driving the associated raster output scanner and driving the associated raster output scanner with the selected data.

2. The method of claim 1 wherein selecting data comprises:
selecting data from an input raster that is associated with a target output raster position that is relatively close to the sub-raster position when the current writing pass for the target output raster is associated with a relatively high target writing power from the set of available target writing powers and selecting data from an input raster that is associated with a target output raster position that is relatively far from the sub-raster position when the current writing pass for the target output raster is associated with a relatively low target writing power from the set of available target writing powers.

3. The method of claim 1 wherein selecting data comprises:
selecting data from an input raster that is associated with a target output raster position that is relatively close to the sub-raster position for a relatively higher fraction of the selected number of respective enumerated writing passes and selecting data from an input raster that is associated with a target output raster position that is relatively far from the sub-raster position for a relatively lower fraction of the selected number of respective enumerated writing passes.

4. The method of claim 1 wherein selecting data comprises:
selecting data from a first input raster that is associated with a target raster position that is adjacent to a first side of the sub-raster position when the enumerated writing pass is a first writing pass and selecting data from a second input raster that is associated with a target raster position that is adjacent to a second side of the sub-raster position when the enumerated writing pass is a second writing pass when the first and second input rasters are associated with first and second target raster positions that are equidistant from the sub-raster position and wherein the first and second writing passes are associated with equal target writing powers.

5. The method of claim 1 wherein the compensation profile is stored as a series of respective offset changes associated with a series of respective sequential block positions, each respective offset change being relative to an offset associated with an immediately preceding block position, wherein an initial absolute offset is associated with a first block position and a first element of the series of respective offset changes is associated with a second block position and is relative to the initial absolute offset and, wherein selecting data comprises:

determining an uncompensated input image data address associated with the currently selected target output image block;

determining a number of address locations associated with a full raster line, thereby determining a raster line address offset;

calculating a compensation offset value based on the initial absolute offset and, if appropriate, selected ones of the series of respective offset changes, wherein selected ones of the series of respective offset changes are appropriately selected if a position of the target output image block is other than the first block position and wherein the appropriately selected respective offset changes include the respective offset change associated with the block position of the currently selected target output image block and respective offset changes associated with any block positions between a position of the currently selected target output image block and a first block position of a raster associated with the currently selected target output image block, wherein the calculation includes an arithmetic combination of the initial absolute offset and any appropriately selected respective offset changes;

calculating a partially compensated input image data address according to an arithmetic combination of the uncompensated input image data address, the raster line address offset and a whole number portion of the compensation offset value, wherein the arithmetic combination comprises a multiplication of the raster line address offset by the whole number portion of the compensation offset value and an addition of the resulting product to the uncompensated input image data address, or comprises the initialization of a variable to the uncompensated input image data address and the addition and/or subtraction of the raster line address offset to or from the variable a number of times equaling the whole number portion of the compensation offset value; and selecting data from the partially compensated input image data address or from an address that is separated from the partially compensated input image data address by a distance in memory space equivalent to the raster line address offset, wherein the selection is made based on a fractional or sub-raster portion of the compensation offset value, the set of emulatable sub-raster positions, the writing pass number associated with the current writing pass and/or the target writing power associated with the current writing pass.

6. A method for providing rendering device registration error compensation for binary image data that is structured as a set of raster lines of pixels and wherein sets of one or more raster lines can be read as respective sets of blocks of one or more pixels, wherein a compensation profile for an associated rendering device, compensating for a registration error profile of the rendering device, is known and wherein a number of respective writing passes to be used by the rendering device in rendering each raster line and respective writing powers associated with the respective writing passes are known, the method comprising:

determining a set of sub-raster spacing emulation positions that can be emulated given the number of respective writing passes and the respective target writing powers associated with each respective writing pass; and for each respective writing pass associated with a currently selected target output block, preparing to render the currently selected target output block by:
selecting data from the binary image data based on a target output position associated with the currently selected target output block, the compensating block offset value for the target output block, the set of emulatable sub-raster positions, a writing pass number associated with a current writing pass and a target writing power associated with the current writing pass, wherein image data from respective adjacent rasters of the binary image data is selected based on the compensating block offset, wherein a sub-raster spacing correction determined from the compensating block offset value and the set of emulatable sub-raster positions is emulated by selecting data from respective adjacent rasters according to the target writing power and/or writing pass number associated with the current writing pass; and
at least one of storing the selected data for driving the associated raster output scanner and driving the associated raster output scanner with the selected data.

7. The method of claim 6 wherein selecting data comprises:
selecting data from an input raster that is associated with a target output raster position that is relatively close to the sub-raster position when the current writing pass for the target output raster is associated with a relatively high target writing power from the set of available target writing powers and selecting data from an input raster that is associated with a target output raster position that is relatively far from the sub-raster position when the current writing pass for the target output raster is associated with a relatively low target writing power from the set of available target writing powers.

8. The method of claim 6 wherein selecting data comprises:
selecting data from an input raster that is associated with a target output raster position that is relatively close to the sub-raster position for a relatively higher fraction of the selected number of respective enumerated writing passes and selecting data from an input raster that is associated with a target output raster position that is relatively far from the sub-raster position for a relatively lower fraction of the selected number of respective enumerated writing passes.

9. The method of claim 6 wherein selecting data comprises:
selecting data from a first input raster that is associated with a target raster position that is adjacent to a first side of the sub-raster position when the enumerated writing pass is a first writing pass and selecting data from a second input raster that is associated with a target raster position that is adjacent to a second side of the sub-raster position when the enumerated writing pass is a second writing pass when the first and second input rasters are associated with first and second target raster positions that are equidistant from the sub-raster position and wherein the first and second writing passes are associated with equal target writing powers.

10. The method of claim 6 wherein the compensation profile is stored as a series of respective offset changes associated with a series of respective sequential block positions, each respective offset change being relative to an offset associated with an immediately preceding block position, wherein an initial absolute offset is associated with a first block position and a first element of the series of respective offset changes is associated with a second block position and is relative to the initial absolute offset and, wherein selecting data comprises:

determining an uncompensated input image data address associated with the currently selected target output image block;
determining a number of address locations associated with a full raster line, thereby determining a raster line address offset;
calculating a compensation offset value based on the initial absolute offset and, if appropriate, selected ones of the series of respective offset changes, wherein selected ones of the series of respective offset changes are appropriately selected if a position of the target output image block is other than the first block position and wherein the appropriately selected respective offset changes include the respective offset change associated with the block position of the currently selected target output image block and respective offset changes associated with any block positions between a position of the currently selected target output image block and a first block position of a raster associated with the currently selected target output image block, wherein the calculation includes an arithmetic combination of the initial absolute offset and any appropriately selected respective offset changes;
calculating a partially compensated input image data address according to an arithmetic combination of the uncompensated input image data address, the raster line address offset and a whole number portion of the compensation offset value, wherein the arithmetic combination comprises a multiplication of the raster line address offset by the whole number portion of the compensation offset value and an addition of the resulting product to the uncompensated input image data address, or comprises the initialization of a variable to the uncompensated input image data address and the addition and/or subtraction of the raster line address offset to or from the variable a number of times equaling the whole number portion of the compensation offset value; and
selecting data from the partially compensated input image data address or from an address that is separated from the partially compensated input image data address by a distance in memory space equivalent to the raster line address offset, wherein the selection is made based on a fractional or sub-raster portion of the compensation offset value, the set of emulatable sub-raster positions, the writing pass number associated with the current writing pass and/or the target writing power associated with the current writing pass.

11. A system for providing rendering device registration error compensation for binary image data, the system comprising:
a raster memory that is used to store binary input image data that is readable as at least one block, each block including at least one pixel of at least one raster line of the binary image data;
a profile that includes information regarding at least one of a compensation for a registration error of an associated rendering device and the registration error of the associated rendering device from which a compensation can be determined;
a target output block position determiner that determines a target position associated with a currently selected target output block of output image data;
a compensating block offset determiner that determines a compensating block offset value from a target position associated with the currently selected target output block and the profile, wherein the compensating block offset includes a whole raster part and a sub-raster part; and an output data selector that selects data from the raster memory for use in preparing to render the currently selected target output block based on the target output position associated with the currently selected target output block, the compensating block offset value, a number of emulatable sub-raster positions determined from a selected number of respective writing passes to be used by the associated rendering device to render the at least one raster line of the currently selected output block and a set of respective target writing powers to be used by the associated rendering device to render the at least one raster of the currently selected output block in the respective writing passes, a writing pass number associated with a current writing pass and/or a target writing power associated with the current writing pass, wherein image data from respective adjacent rasters is selected based on the compensating block offset, wherein sub-raster spacing correction is emulated by selecting data from respective adjacent rasters according to the target writing power and/or writing pass number associated with the current writing pass.

12. The system of claim 11 wherein the output data selector selects data for use in preparing to render the currently selected target output block according to a compensating block offset value that calls for a sub-raster position emulation by selecting data from an input raster that is associated with a target output raster position that is relatively close to the sub-raster position when the current writing pass for the target output raster is associated with a relatively high target writing power and selecting data from an input raster that is associated with a target output raster position that is relatively far from the sub-raster position when the current writing pass for the target output raster is associated with a relatively low target writing power.

13. The system of claim 11 wherein the output data selector selects data for use in preparing to render the currently selected target output block according to a compensating block offset value that calls for a sub-raster position emulation by selecting data from an input raster that is associated with a target output raster position that is relatively close to the sub-raster position for a relatively higher fraction of the selected number of respective enumerated writing passes and selecting data from an input raster that is associated with a target output raster position that is relatively far from the sub-raster position for a relatively higher fraction of the selected number of respective enumerated writing passes.

14. The system of claim 11 wherein the output data selector selects data for use in preparing to render the currently selected target output block according to a compensating block offset value that calls for a sub-raster position emulation by selecting data from a first input raster that is adjacent to a first side of a target output raster position when the enumerated writing pass is a first writing pass and selecting data from a second input raster that is adjacent to a second side of the target output raster position when the enumerated writing pass is a second writing pass when the first and second input rasters are associated with first and second target raster positions that are equidistant from the sub-raster position and wherein the first and second writing passes are associated with equal target writing powers.

15. The system of claim 11 wherein the profile is stored as a series of respective offset changes associated with a series of respective sequential block positions, each respective offset change being relative to an offset associated with an immediately preceding block position, wherein an initial absolute offset is associated with a first block position and a first element of the series of respective offset changes is associated with a second block position and is relative to the initial absolute offset and, wherein the compensation block offset determiner:

determines an uncompensated input image data address associated with the currently selected target output image block position, determines a number of address locations associated with a full raster line, thereby determining a raster line address offset, calculates a compensation offset value based on the initial absolute offset and, if appropriate, selected ones of the series of respective offset changes, wherein selected ones of the series of respective offset changes are appropriately selected if the position of the target output image block is other than the first block position and wherein the appropriately selected respective offset changes include the respective offset change associated with the block position of the currently selected target output image block and respective offset changes associated with any block positions between a position of the currently selected target output image block and the first block position of a raster associated with the currently selected target output block, wherein the calculation includes an arithmetic combination of the initial absolute offset and any appropriately selected respective offset changes; and, wherein the output data selector:

calculates a partially compensated input image data address according to an arithmetic combination of the uncompensated input image data address, the raster line address offset and a whole number portion of the compensation offset value, wherein the arithmetic combination comprising a multiplication of the raster line address offset by the whole number portion of the compensation offset value and an addition of the resulting product with the uncompensated input image data address, or comprising the initialization of a variable to the uncompensated input image data address and the addition and/or subtraction of the raster line address offset to or from the variable a number of times equaling the whole number portion of the compensation offset value; and, selects data from the partially compensated input image data address or from an address that is separated from the partially compensated input image data address by a distance in memory space equivalent to the raster line address offset, wherein the selection is made based on a fractional portion or sub-raster portion of the compensation offset value, the set of emulatable sub-raster positions, the writing pass number associated with the current writing pass and/or the target writing power associated with the current writing pass.

* * * * *